(12) United States Patent  
Lindeman et al.

(10) Patent No.: US 9,374,654 B2  
(45) Date of Patent: **\*Jun. 21, 2016**

(54) MANAGEMENT OF MOBILE APPLICATIONS

(71) Applicant: MOBILE IRON, INC., Mountain View, CA (US)

(72) Inventors: Jesse Wagner Lindeman, San Jose, CA (US); Thomas Edward Wagner, San Jose, CA (US); Suresh Kumar Batchu, Milpitas, CA (US); Ojas Udayan Rege, Palo Alto, CA (US); Ajay Kumar Mishra, San Jose, CA (US); Robert Bates Tinker, San Francisco, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,140

(22) Filed: Sep. 11, 2014

(65) Prior Publication Data

US 2015/0133094 A1    May 14, 2015

Related U.S. Application Data

(63) Continuation of application No. 14/181,450, filed on Feb. 14, 2014, now Pat. No. 8,862,105, which is a continuation of application No. 13/679,947, filed on Nov. 16, 2012, now Pat. No. 8,731,529, which is a continuation of application No. 12/950,933, filed on Nov. 19, 2010, now Pat. No. 8,359,016.

(51) Int. Cl.
*H04W 4/00* (2009.01)
*G06F 3/048* (2013.01)
*G06F 9/445* (2006.01)
(Continued)

(52) U.S. Cl.
CPC .............. *H04W 4/003* (2013.01); *G06F 3/048* (2013.01); *G06F 8/60* (2013.01); *G06Q 30/0603* (2013.01); *H04L 67/303* (2013.01); *H04L 67/34* (2013.01);
(Continued)

(58) Field of Classification Search
CPC ..... H04W 12/00; H04L 67/34; H04L 67/303; H04L 63/20; G06F 8/60; G06Q 20/351; G06Q 20/20; G06Q 30/0238
USPC .............. 455/456.1, 456.3; 713/176; 705/1.1; 726/4, 6

See application file for complete search history.

(56) References Cited

U.S. PATENT DOCUMENTS 6,553,375 B1    4/2003    Huang et al.
7,409,208 B1    8/2008    Clare et al.
(Continued)

OTHER PUBLICATIONS

Petition for Inter Partes Review for U.S. Pat. No. 8,731,529. Apr. 22, 2015.

(Continued)

*Primary Examiner* — Phuoc H Doan  
(74) *Attorney, Agent, or Firm* — Van Pelt, Yi & James LLP

(57) ABSTRACT

In particular implementations, a mobile device management system allows network administrators to control the distribution and publication of applications to mobile device users in an enterprise network. A user profile is accessed to determine a user attribute. A catalog of applications is filtered based at least in part on the user attribute and an enterprise application availability policy to determine a set of applications to be returned and provided via an enterprise mobile device application management interface.

20 Claims, 11 Drawing Sheets

(51) Int. Cl.
   *H04L 29/08* (2006.01)
   *H04W 12/08* (2009.01)
   *H04W 12/00* (2009.01)
   *G06Q 30/06* (2012.01)
   *H04L 29/06* (2006.01)

(52) U.S. Cl.
   CPC .............. *H04W 4/001* (2013.01); *H04W 12/00* (2013.01); *H04W 12/08* (2013.01); *H04L 63/20* (2013.01)

(56) References Cited

U.S. PATENT DOCUMENTS

| | | | |
|---|---|---|---|
| 8,731,529 | B2 | 5/2014 | Lindeman et al. |
| 2002/0131404 | A1 | 9/2002 | Mehta et al. |
| 2003/0022657 | A1 | 1/2003 | Herschberg et al. |
| 2003/0084165 | A1 | 5/2003 | Kjellberg et al. |
| 2006/0031529 | A1 | 2/2006 | Keith, Jr. |
| 2009/0254753 | A1 | 10/2009 | De Atley et al. |
| 2010/0088367 | A1 | 4/2010 | Brown et al. |
| 2011/0010759 | A1* | 1/2011 | Adler ................ 726/4 |
| 2011/0178863 | A1* | 7/2011 | Daigle ............... G06Q 30/0231 705/14.31 |
| 2011/0184809 | A1* | 7/2011 | Beavers ............. G06Q 30/0267 705/14.64 |
| 2012/0265744 | A1* | 10/2012 | Berkowitz et al. ............ 707/705 |

OTHER PUBLICATIONS

Declaration of Dr. Robert Akl in support of Petition for Inter Partes Review. Apr. 22, 2015.
Curriculum Vitae of Dr. Robert Akl. Apr. 22, 2015.

* cited by examiner

| Smartphones & Users | Mobile Activity Intelligence | Security & Policies | Apps & Files | Troubleshooting | Event Center | Settings | Log |

Application Catalog | Application Settings | File Management

Application Catalog(1.3.2-3.0.0-23)

| Delete | Add New 802 | More Actions ▾ | Labels All-Smartphones ▾ | Search by App. 🔍 | | |
|---|---|---|---|---|---|---|
| ☐ | Application Name | Category | Platform Name | | # Phones | Source |
| ☐ | Mobileiron BlackBerry Client (v | | BlackBerry | | 0 | Catalog |
| ☐ | Mobileiron Symbian Client (v3 | | Symbian 9.1, Symbian 9.5, Symbian 9.4, | | 0 | Catalog |
| ☐ | Mobileiron Symbian Client (v3 | | Symbian 9.1, Symbian 9.5, Symbian 9.4, | | 0 | Catalog |
| ☐ | YahooIM | | iPhone 2.2, iPhone, iPhone 3.1, iPhone 3. | | 0 | Catalog |
| ☐ | Mobileiron BlackBerry Client (v | | BlackBerry | | 1 | Catalog |
| ☐ | Mobileiron Windows Mobile Cli | | Windows Mobile 6.0 Professional, Windo | | 0 | Catalog |
| ☐ | Mobileiron Symbian Client (v3 | | Symbian 9.1, Symbian 9.5, Symbian 9.4, | | 1 | External |
| ☐ | Quicksheet | | | | 1 | External |
| ☐ | Microsoft My Phone | | | | 1 | External |
| ☐ | Quickpoint | | | | 1 | External |
| ☐ | Kinoma FreePlay | | | | 1 | External |
| ☐ | Quickoffice | | | | 1 | External |

Application Details  [Edit]

Please select an item to view details

|◁ ◁ Page [1] of 3 ▷ ▷| ⟳          1 - 20 of 43

| Smartphones & Users | Mobile Activity Intelligence | Security & Policies | Apps & Files | Troubleshooting | Event Center | Settings | Log |

Application Catalog   Application Settings   File Management

Application Catalog(1.3.2-3.0.0-23)

| Delete | Add New | More Actions ▼ | | Labels | All-Smartphones ▽ | | Search by App. 🔍 | | |
|---|---|---|---|---|---|---|---|---|---|
| ☐ | Application Name | Category | Platform Name | | | # Phones | Source | | |
| ☐ | MobileIron BlackBerry Client (v | | BlackBerry | | | 0 | Catalog | | |
| ☐ | MobileIron Symbian Client (v3 | | Symbian 9.1, Symbian 9.5, Symbian 9.4, | | | 0 | Catalog | | |
| ☐ | MobileIron Symbian Client (v3 | | Symbian 9.1, Symbian 9.5, Symbian 9.4, | | | 0 | Catalog | | |
| ☐ | YahooIM | | iPhone 2.2, iPhone, iPhone 3.1, iPhone 3. | | | 0 | Catalog | | |
| ☐ | MobileIron BlackBerry Client (v | | BlackBerry | | | 0 | Catalog | | |
| ☐ | MobileIron Windows Mobile Cli | | Windows Mobile 6.0 Professional, Windo | | | 1 | Catalog | | |
| ☐ | MobileIron Symbian Client (v3 | | Symbian 9.1, Symbian 9.5, Symbian 9.4, | | | 0 | Catalog | | |
| ☐ | Quicksheet | | | | | 1 | External | | |
| ☐ | Microsoft My Phone | | | | | 1 | External | | |
| ☑ | Quickpoint | | | | | 1 | External | | |
| ☐ | Kinoma FreePlay | | | | | 1 | External | | |
| ☐ | Quickoffice | | | | | 1 | External | | |

|◁ ◁ | Page [ 1 ] of 3 | ▷ ▷| | ⟳    1 - 20 of 43

External Application Details    [Edit]

Quickpoint
Created at
2010-05-29 1:11:34 PM    [See All]

▲ Usage
▲ Push-install
▲ Publish
▲ Watchlist
▲ Details

ActiveSync Smartphones

| Block | Allow | Wipe | Remove | Register | Show | | | Search User | Search by User | | | Show Device Details ☐ |
|---|---|---|---|---|---|---|---|---|---|---|---|---|
| | User ▲ | Number | Phone | OS | MobileIron St | ActiveSync Status | First Sync Time | Mailbox ID | | | | ActiveSync Details |
| ☐ | Jeff a. B | | HTC-P4600 | WinMo | Unregistered | Allowed | 2010-03-22 2:43:0 | jbisby | | | | |
| ☐ | Jeff a. B | | Palm | Palm | Unregistered | Allowed | 2010-03-25 3:20:5 | jbisby | | | | |
| ☐ | Jesse Lin | | Android | Not Availabl | Unregistered | Blocked | 2009-12-11 4:30:5 | jlinton | | | | Please select an item to view details |
| ☐ | Joe Mont | | iPhone | iPhone | Unregistered | Allowed | 2010-03-23 9:28:2 | jmontague | | | | |
| ☐ | Manuel R | | iPhone | iPhone | Unregistered | Allowed | 2010-01-06 11:24: | mreynolds | | | | |
| ☐ | Manuel R | | iPhone | iPhone | Unregistered | Allowed | 2010-03-23 10:12: | mreynolds | | | | |
| ☐ | Sean Gin | PDA | iPhone | iPhone | Registered | Allowed | 2009-12-08 1:36:5 | sginston | | | | |

*FIG. 12*

MANAGEMENT OF MOBILE APPLICATIONS

CROSS REFERENCE TO OTHER APPLICATIONS

This application is a continuation of co-pending U.S. patent application Ser. No. 14/181,450, entitled MANAGEMENT OF MOBILE APPLICATIONS filed Feb. 14, 2014, which is a continuation of U.S. patent application Ser. No. 13/679,947, now U.S. Pat. No. 8,731,529, entitled MANAGEMENT OF MOBILE APPLICATIONS filed Nov. 16, 2012, which is a continuation of U.S. patent application Ser. No. 12/950,933, now U.S. Pat. No. 8,359,016, entitled MANAGEMENT OF MOBILE APPLICATIONS filed Nov. 19, 2010, all of which are incorporated herein by reference for all purposes.

TECHNICAL FIELD

This disclosure relates generally to mobile devices and management systems and, more particularly, to managing applications for mobile devices.

BACKGROUND OF THE INVENTION

In a manner similar to personal computers and laptops, business enterprises increasingly rely on mobile and handheld devices. Indeed, the capabilities and uses of mobile devices have moved beyond voice communications and personal information management applications to a variety of communications- and business-related functions including email, browsing, instant messaging, enterprise applications, and video applications. For example, the functionality of many mobile devices have been extended to include cellular and wireless local area network (WLAN) communications interfaces, as well as virtual private network (VPN) and other client applications. Furthermore, mobile devices used in enterprises may also include enterprise applications used by employees in the field or otherwise.

Deployment, management and configuration of mobile and handheld devices in enterprise environments, however, present certain challenges. For example, the vast and constantly changing variety of mobile device types, functions and capabilities presents challenges to configuration, provisioning and troubleshooting. Moreover, the number and variety of applications that can be installed on mobile devices, as well as the nature of the mobile devices themselves, challenges network administrators relative to network security, deployment and overall management.

BRIEF DESCRIPTION OF THE DRAWINGS

Various embodiments of the invention are disclosed in the following detailed description and the accompanying drawings.

FIGS. 8, 9 and 10 show example application management interfaces.

FIG. 12 is an example mobile device management interface for ActiveSync and similar clients.

DETAILED DESCRIPTION

Figure 1:
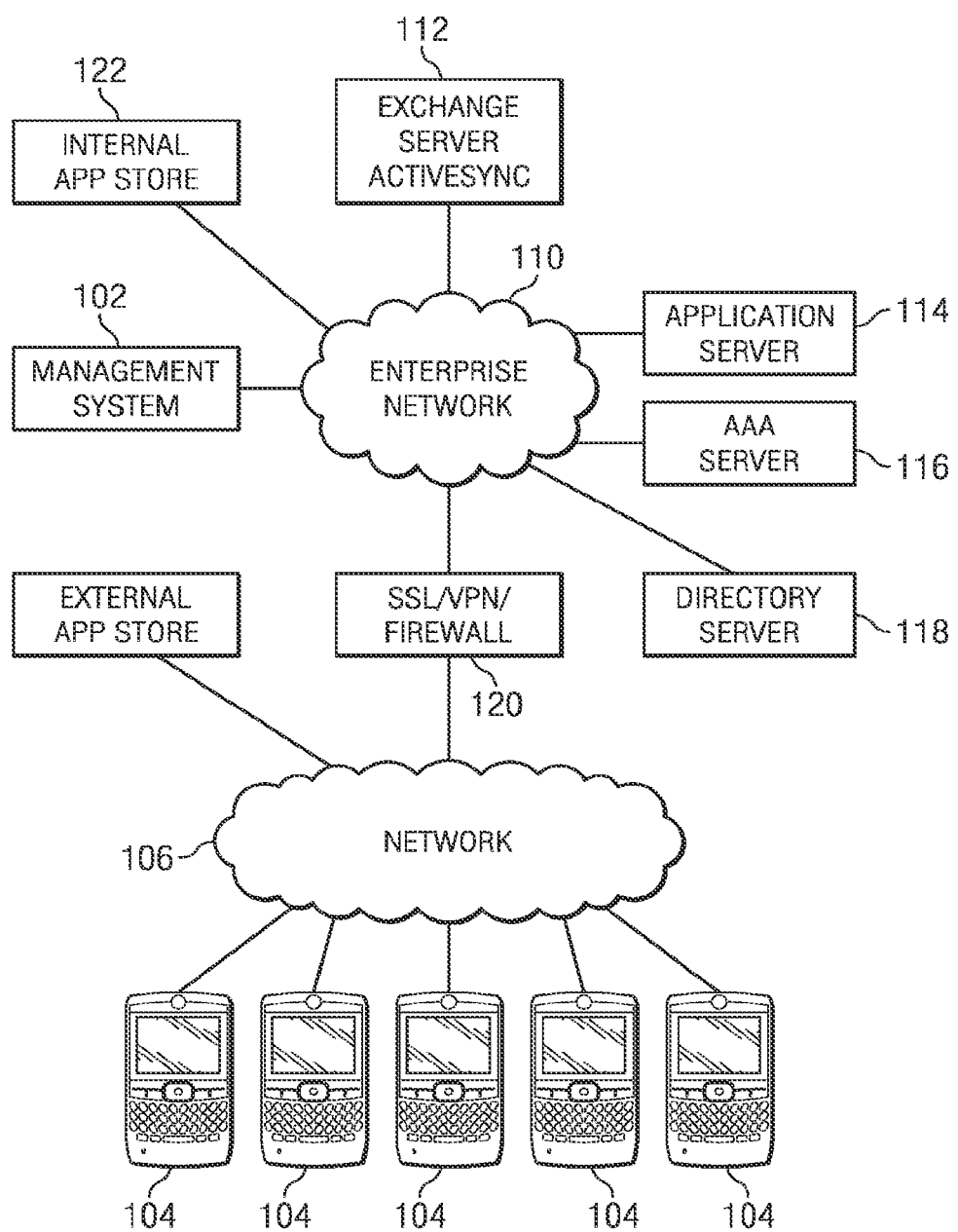
FIG. 1 illustrates an example mobile device management architecture according to an embodiment of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Particular embodiments of the present disclosure provide methods, apparatuses and systems directed to managing and controlling the deployment of applications hosted on mobile devices in an enterprise environment. In particular In particular embodiments, a mobile device management system allows network administrators to control the distribution and publication of applications to mobile device users in an enterprise network. In some implementations, the device management system allows network administrators to configure lists or catalogs of authorized and recommended applications regardless of what system (internal/external) hosts access to the executable for download. The mobile device management system may also monitor the installation of applications on mobile devices and take policy actions based on the detected installs. In some particular embodiments, a mobile device management system is operative to monitor the security state of one or more mobile devices and set indicators related to such security state. Enterprise network applications, such as an email application, can access the security state information when making access control decisions with respect to a given mobile device.

In particular embodiments, each mobile device includes a control client application (hereinafter referred to as "control client") that is configured to interact with the device management system and a network link. More particularly, the control client application is configured to receive data, commands, and other messages from the device management system via a network link, to synchronize the state of the mobile device with the corresponding device object stored at the device management database, and to selectively track and upload data over the network link to the device management system and database. In various embodiments, the control client logs man-machine interface (MMI) data, file system commands, and other data characterizing usage of, and/or the actions performed on, the mobile device. Some or all of the log data is provided to the device management application hosted on the device management server, which can synchronize a device object stored at the database with that of the mobile device, and vice versa.

FIG. 1 illustrates a block diagram of a computer network environment 100 in accordance with an example embodiment. Computer network environment 100 includes a device management system 102 and a plurality of mobile devices 104 that may each communicate with device management system 102 via one or more network links 106. In various embodiments, device management system 102 may actually comprise one or more device management servers and device management databases, one or more of which may or may not be physically located within the physical boundaries of the enterprise.

Network link(s) 106 may include any suitable number or arrangement of interconnected networks including both wired and wireless networks. By way of example, a wireless communication network link over which mobile devices 104 communicate may utilize a cellular-based communication infrastructure that includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link 106 may further include, or alternately include, a variety of communication channels and networks such as WLAN/ WiFi, WiMAX, Wide Area Networks (WANs), and Blue-Tooth.

As FIG. 1 illustrates, device management system 102 may be operably connected with (or included within) an enterprise network 110 (which may include or be a part of network link(s) 106). Enterprise network 110 may further include one or more of email or exchange servers 112, enterprise application servers 114, internal application store servers 122, authentication (AAA) servers 116, directory servers 118, Virtual Private Network (VPN)/SSL gateways 120, firewalls, among other servers and components. Email or exchange servers 112 may include Exchange ActiveSync (EAS) or other functionality that provides synchronization of contacts, calendars, tasks, and email between ActiveSync-enabled servers and mobile devices. Other synchronization protocols can also be used. The mobile devices 104 may access or utilize one or more of these enterprise systems or associated functionality.

Example System Architectures for Management System and Mobile Devices

Figure 2:
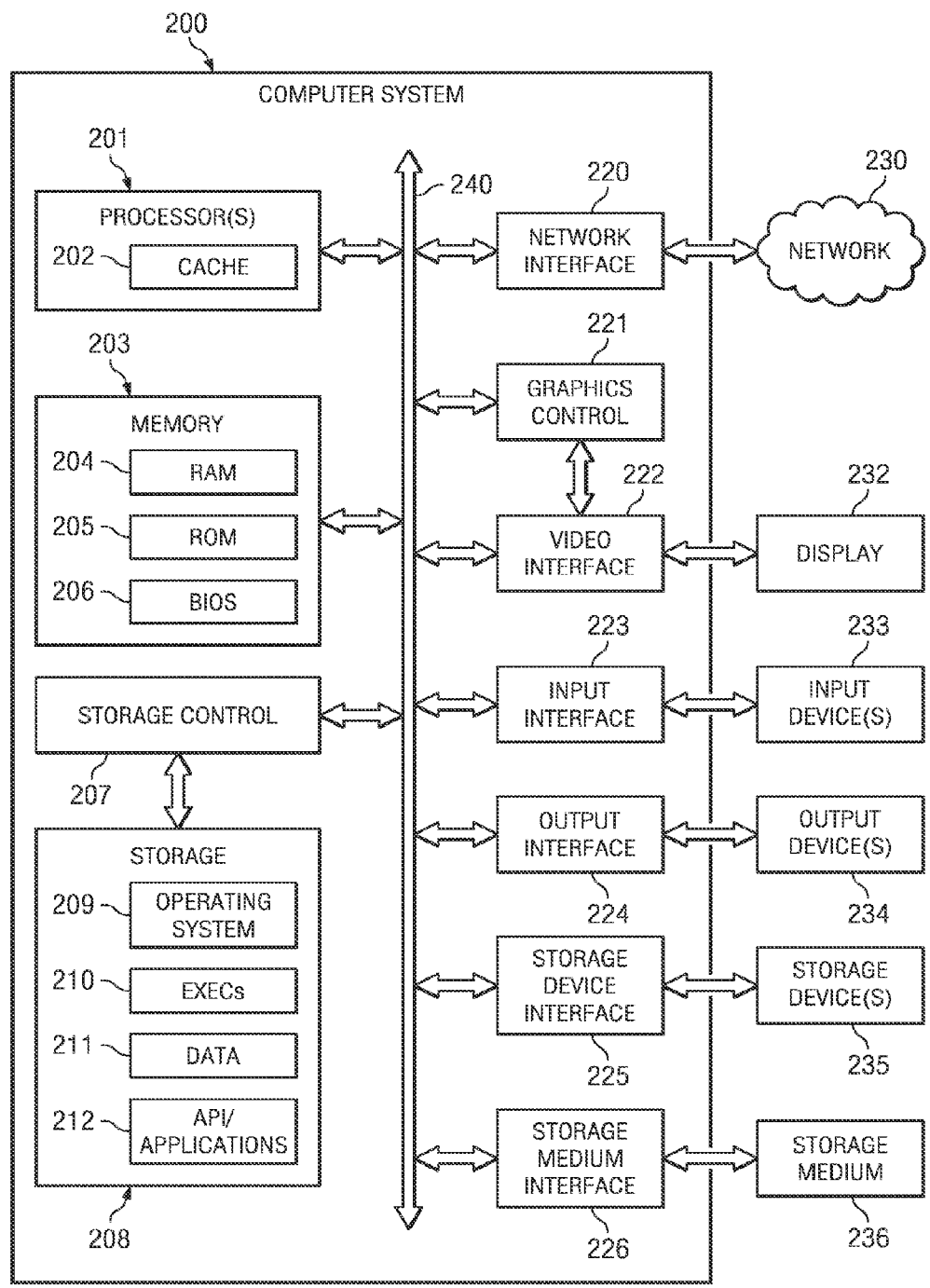
FIG. 2 is a schematic diagram illustrating an example server system architecture.

Management system 102 may actually include one or more hardware, firmware, and software components residing at one or more computer servers or systems (hereinafter referred to as computer systems). Software components of device management system 102 may be at one or more of the same computer systems. FIG. 2 illustrates an example computer system 200. Device management system 102 may include software components at one or more computer systems, which may be similar to example computer system 200. Particular embodiments may implement various functions of device management system 102 as hardware, software, or a combination of hardware and software. As an example and not by way of limitation, one or more computer systems may execute particular logic or software to perform one or more steps of one or more processes described or illustrated with respect to device management system 102. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more tangible computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. A tangible computer-readable medium may include one or more nanometer-scale components or otherwise embody nanometer-scale design or fabrication. Example tangible, non-transitory computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

The components in FIG. 2 are examples only and do not limit the scope of use or functionality of any hardware, software, embedded logic component, or a combination of two or more such components implementing particular embodiments. Computer system 200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 200 may include a display 232, one or more input devices 233 (which may, for example, include a keypad, a keyboard, a mouse, a stylus, etc.), one or more output devices 234, one or more storage devices 235, and various tangible storage media 236.

Bus 240 connects a wide variety of subsystems. Herein, reference to a bus may encompass one or more digital signal lines serving a common function, where appropriate. Bus 240 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 201 (or central processing unit(s) (CPU(s))) optionally contains a cache memory unit 202 for temporary local storage of instructions, data, or computer addresses. Processor(s) 201 are coupled to tangible storage devices including memory 203. Memory 203 may include random access memory (RAM) 204 and read-only memory (ROM) 205. ROM 205 may act to communicate data and instructions unidirectionally to processor(s) 201, and RAM 704 may act to communicate data and instructions bidirectionally with processor(s) 201. ROM 205 and RAM 204 may include any suitable tangible computer-readable media described below. Fixed storage 208 is connected bidirectionally to processor(s) 201, optionally through storage control unit 207. Fixed storage 208 provides additional data storage capacity and may also include any suitable tangible computer-readable media described. Storage 208 may be used to store operating system 209, EXECs 210, data 211, application programs 212, and the like. Typically, storage 208 is a secondary storage medium (such as a hard disk) that is slower than primary storage. Information in storage 208 may, in appropriate cases, be incorporated as virtual memory in memory 203.

Processor(s) 201 is connected to multiple interfaces, such as graphics control 221, video interface 222, input interface 223, output interface 224, storage interface 225, and storage medium interface 226. These interfaces are in turn connected to appropriate devices, as may be illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer system, or other suitable I/O device or a combination of two or more such I/O devices. Processor(s) 201 may connect to another computer system or to telecommunications network 230 (which may include network link 106 or enterprise network 110) through network interface 220. With network interface 220, CPU 201 may communicate with network 230 in the course of performing one or more steps of one or more processes described or illustrated herein, according to particular needs. Moreover, one or more steps of one or more processes described or illustrated herein may execute solely at CPU 201. In addition or as an alternative, one or more steps of one or more processes described or illustrated herein may execute at multiple CPUs 201 that are remote from each other across network 230.

In particular embodiments, when computer system 200 is connected to network 230, computer system 200 may communicate with other devices, specifically mobile devices 104 and enterprise systems, connected to network 230. Communications to and from computer system 200 may be sent through network interface 220. For example, network interface 220 may receive incoming communications (such as requests or responses from other devices) in the form of one or more packets (such as Internet Protocol (IP) packets) from network 230 and computer system 200 may store the incoming communications in memory 203 for processing. Computer system 200 may similarly store outgoing communications (such as requests or responses to other devices) in the form of one or more packets in memory 203 and communicated to network 230 from network interface 220. Processor(s) 201 may access these communication packets stored in memory 203 for processing.

Computer system 200 may provide functionality as a result of processor(s) 201 executing software embodied in one or more tangible computer-readable storage media, such as memory 203, storage 208, storage devices 235, and/or storage medium 236. The computer-readable media may store software that implements particular embodiments, and processor(s) 201 may execute the software. Memory 203 may read the software from one or more other computer-readable media (such as mass storage device(s) 235, 236) or from one or more other sources through a suitable interface, such as network interface 220. The software may cause processor(s) 201 to carry out one or more processes or one or more steps of one or more processes described or illustrated herein. Carrying out such processes or steps may include defining data structures stored in memory 203 and modifying the data structures as directed by the software. In addition or as an alternative, computer system 200 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

In particular embodiments, a mobile device 104 is a wireless phone such as a mobile or cellular phone. By way of example, mobile device 104 may be a smartphone (e.g., the iPhone manufactured by Apple Inc. of Cupertino, Calif., the BlackBerry manufactured by Research in Motion (RIM), the G1 based on the Android operating system, or Samsung BlackJack based on the Windows Mobile operating system), tablet (e.g. the iPad manufactured by Apple Inc. of Cupertino, Calif.), feature phone, basic cellular phone, personal digital assistant, or other multimedia device. Additionally, mobile device 104 may be affiliated with and supported by any suitable carrier or network service provider such as, by way of example, Sprint PCS, T-Mobile, Verizon, AT&T, or other suitable carrier.

Figure 3:
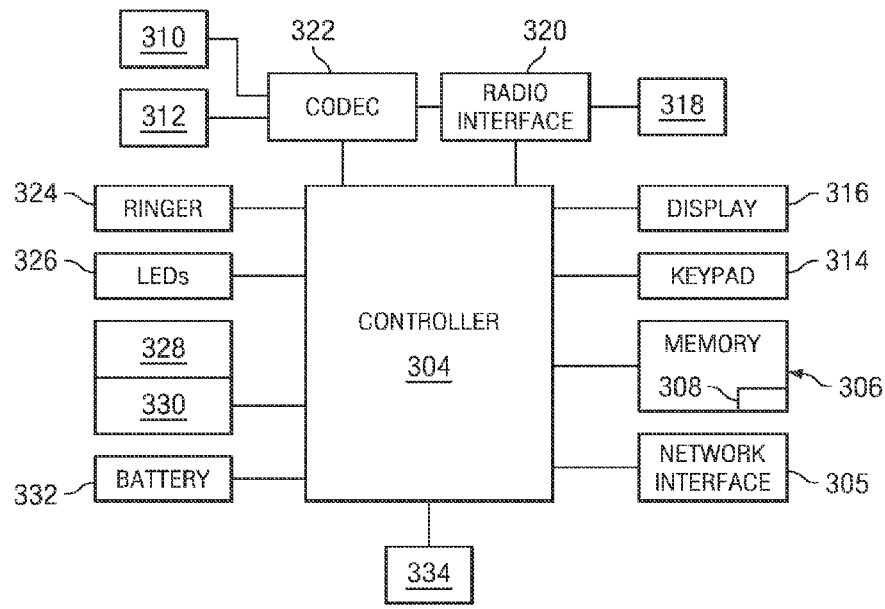
FIG. 3 is a schematic diagram illustrating an example mobile device system architecture.

FIG. 3 shows a schematic representation of the main components of an example mobile device 104, according to various particular embodiments, which is adapted for use in connection with a GSM network or any other mobile telephone network as described above, and which may also be configured to meet the wireless application protocol specification (WAP). Mobile device 104 generally includes a controller 304 which may comprise a microcontroller or one or more processors configured to execute instructions and to carry out operations associated with mobile device 104. In various embodiments, controller 304 may be implemented as a single-chip, multiple chips and/or other electrical components including one or more integrated circuits and printed circuit boards. Controller 304 may optionally contain a cache memory unit for temporary local storage of instructions, data, or computer addresses. By way of example, using instructions retrieved from memory, controller 304 may control the reception and manipulation of input and output data between components of mobile device 104.

Controller 304 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 308 described below) and/or data may be physically stored within a memory block 306 that is operatively coupled to controller 304.

Memory block 306 encompasses one or more storage mediums and generally provides a place to store computer code (e.g., software and/or firmware) and data that are used by mobile device 104. By way of example, memory block 306 may include various tangible computer-readable storage media including Read-Only Memory (ROM) and/or Random-Access Memory (RAM). As is well known in the art, ROM acts to transfer data and instructions uni-directionally to controller 304, and RAM is used typically to transfer data and instructions in a bi-directional manner. Memory block 306 may also include one or more fixed storage devices in the form of, by way of example, solid-state hard disk drives (HDDs), among other suitable forms of memory coupled bi-directionally to controller 304. Information may also reside on a removable storage medium loaded into or installed in mobile device 104 when needed. By way of example, any of a number of suitable memory cards may be loaded into mobile device 104 on a temporary or permanent basis. By way of example, mobile device 104 may also include a subscriber identification module (SIM) card 328 and a SIM card reader 330.

Controller 304 is also generally coupled to a variety of interfaces such as graphics control, video interface, input interface, output interface, and storage interface, and these interfaces in turn are coupled to the appropriate devices. Controller 304 is also coupled to a network interface 305 that allows mobile device 104, and particularly controller 304, to be coupled to another computer (e.g., device management system 102) or telecommunications network (e.g., network link 106 or enterprise network 110). More particularly, network interface 305 generally allows controller 304 to receive information from network link 106, or might output information to the network link in the course of performing various method steps described below. Communications may be sent to and from mobile device 104 via network interface 305. By way of example, incoming communications, such as a request or a response from another device (e.g., device management system 102), in the form of one or more packets, may be received from network link 106 at network interface 305 and stored in selected sections in memory block 306 for processing. Outgoing communications, such as a request or a response to another device (e.g., device management system 102), again in the form of one or more packets, may also be stored in selected sections in memory 306 and sent out to network link 106 at network interface 305. Controller 304 may access these communication packets stored in memory 306 for processing.

Electric signals (e.g., analog) may be produced by microphone 310 and fed to earpiece 312. Controller 304 may receive instruction signals from keypad 314 (which may include soft keys) and control the operation of display 316 (In alternate embodiments, keypad 314 may be implemented as a virtual keypad displayed on display 316). By way of example, display 316 may incorporate liquid crystal display (LCD), light emitting diode (LED), Interferometric modulator display (IMOD), or any other suitable display technology. Radio signals may be transmitted and received by means of an antenna 318 that may be connected through a radio interface 320 to codec 322 configured to process signals under control of controller 304. Thus, in use for speech, codec 322 may receive signals (e.g., analog) from microphone 310, digitize them into a form suitable for transmission, and feed them to radio interface 320 for transmission through antenna 318 to, for example, a public land mobile network (PLMN). Similarly, received signals may be fed to codec 322 so as to produce signals (e.g., analog) which may be fed to ear piece 312. Mobile device 104 also generally includes a ringer (e.g., speaker) 324 and may also include light emitting diodes (LEDs) 326. In particular embodiments, mobile device 104 may be a dual mode phone having a wireless local area network (WLAN) interface, Worldwide Interoperability for Microwave Access (WiMAX) interface, and/or other wireless or physical interfaces (such as BlueTooth® and USB). Additionally, mobile device 104 may be powered by a removable battery pack 332.

Mobile device 104 may also include one or more user input devices 334 (other than keypad 314) that are operatively coupled to the controller 304. Generally, input devices 334 are configured to transfer data, commands and responses from the outside world into mobile device 108. By way of example, mobile device may include a joystick or directional pad. Input devices 334 may also include one or more hard buttons. Input devices may further include Global Positioning System modules, accelerometers, cameras, and the like.

Display device 316 is generally configured to display a graphical user interface (GUI) that provides an easy to use visual interface between a user of the mobile device 104 and the operating system or application(s) running on the mobile device. Generally, the GUI presents programs, files and operational options with graphical images. During operation, the user may select and activate various graphical images displayed on the display 316 in order to initiate functions and tasks associated therewith.

In particular embodiments, each mobile device 104 includes a control client 308 that is configured to interact with the device management system 102 via network link 106. Control client 308 may generally be implemented as one or more software programs or applications stored in, by way of example, memory 306. Control client 308 is configured to receive data, commands, and other messages from the device management system 102 via network link 106, to synchronize the state of the mobile device 104 with a corresponding mobile device profile object stored at a device management database, and to selectively track and upload data over the network link to the device management system for logging by the device management system, as will be described in detail below. The logged data may include particular files (e.g., documents, spreadsheets, pdfs, pictures, etc.) stored in the mobile device as well particular application usage data in the form of, by way of example, activity data (e.g., data regarding calls, messages, and email), content data (e.g., the text within the message or email body), and/or context data (e.g., timestamps and location data, etc.), as will be described in more detail below. In various embodiments, the control client logs man-machine interface (MMI) data, file system commands, and other data characterizing usage of, and/or the actions performed on, the mobile device. Some or all of the log data is provided to the device management application hosted on the device management system 102, which can synchronize a device object stored at the database with that of the mobile device, and vice versa.

In this manner, the device management system 102 may provide an administrator a detailed snapshot of the state of each mobile device 104, and facilitate device management operations. In particular, various embodiments enable selective erasing, tagging, copying, moving, modifying, viewing, and/or other selective action on or of particular data stored in a particular registered mobile device or designated group of mobile devices via the device management system 102.

In particular embodiments, device management system 102 is configured to selectively log data from each of the mobile devices 104 of an enterprise. More particularly, mobile device 104 may be configured to selectively track and/or log data and to upload this data to device management system 102 which, in turn, selectively logs or stores the data. In particular embodiments, each mobile device 104 is first registered with the device management system 102 by creating and storing a device object for the mobile device within the device management system 102. By way of example, an employee desiring to use a personally owned mobile device 104 may indicate to management that he or she desires to use the personally owned mobile device 104 with enterprise related services (e.g., email or access to an enterprise database) and needs enterprise access. Alternately, an employee receiving a mobile device 104 under a corporate liable plan may receive an enterprise owned mobile device 104 upon commencing employment or receiving a mobile device upgrade, by way of example. In particular embodiments, registering a mobile device 104 with the device management system 102 includes creating and storing a device object in a database within or connected with device management system 102. The device object may be implemented as part of a data structure corresponding to the particular mobile device 104. By way of example, a particular device object may include a device identifier that uniquely identifies the corresponding mobile device.

Figure 4:
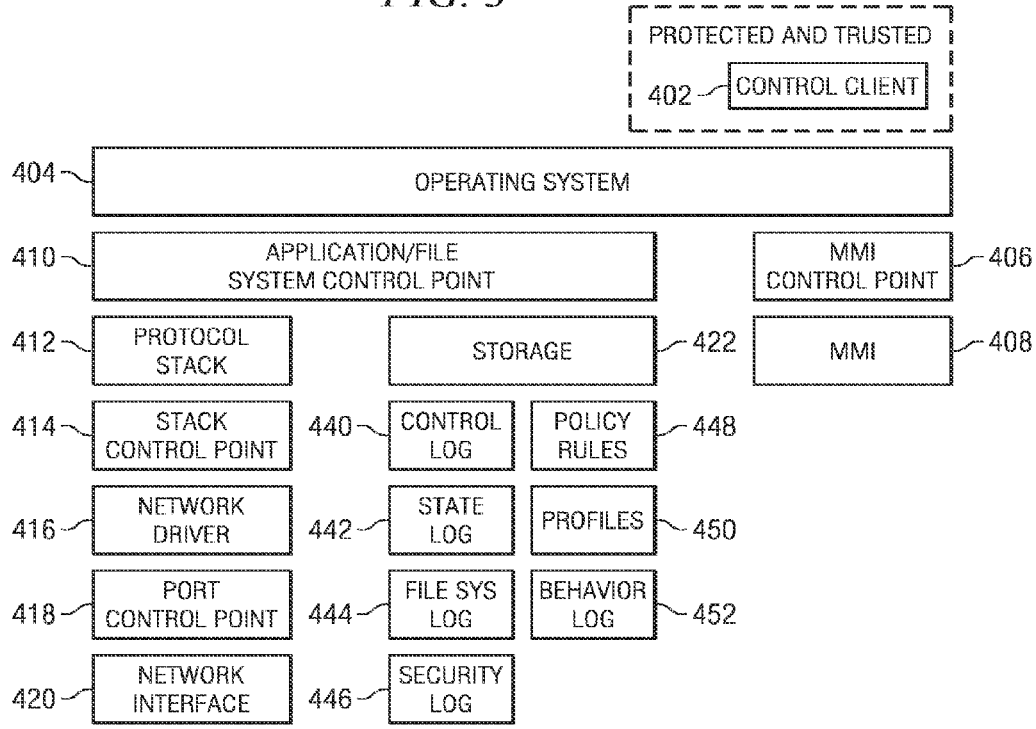
FIG. 4 provides an example mobile device software architecture.

FIG. 4 illustrates how control client functionality may be integrated with mobile device 104. In particular embodiments, the control client functionality may include a control client application 308 and one or more control points inserted to monitor data traversing the interfaces of the mobile device 104. For example, a man-machine interface (MMI) control point 406 may be inserted into the driver stack of the man-machine interface 408 to log keystroke data. An application/file system control point 410 may be inserted to monitor and log application level and file system commands. Additionally, stack control point 414 may be inserted in one or more network protocol stacks of the mobile device 104, while port control points 418 may be inserted at a different layer of the network protocol stack. In various embodiments, one or more of the control points may be implemented as drivers that are installed in the appropriate driver stacks of the mobile device. In some implementations, the control points may emulate the operation of higher layer and/or lower layer drivers and pass data on to the lower or higher layer native drivers. In some embodiments, a rule set may define what data is captured.

Control client application 308 may store the data collected by the control points in one or more log files stored on a storage device of the mobile device. For example, control client application 308 may store file system commands (such as open, save, delete, copy, rename, etc.) in file system log 344. Furthermore, control client application 308 may store keystroke data in behavior log 452. Still further, control client application 308 may store data relating to its own operation in control log 440.

The control client application 308 can provide some of all of the data to device management system 102, which may update one or more data objects that are associated with the mobile device 104 in a database. In this manner, a central device management system 102 can, for example, maintain an accurate image of the data storage device(s) of the mobile device 104, including the applications installed and the files stored on the mobile device. In various embodiments, control client application 308 may operate to provide this data in real-time, intermittently during periods of non-activity (e.g., such as when the mobile device is inserted into a charging cradle), in addition to, or at, periodic intervals. Still further, the data may be provided to the device management system 102 during a synchronization operation between the mobile device and the user's personal computer. In a particular embodiment, a synchronization utility hosted by the user's personal computer may be configured to transmit the data to the device management system 102. In addition, the control client application 308 may operate in one to a plurality of modes based on a set of rules or policies. Furthermore, the control client application 308 may also apply a rule set that determines what data is provided to the device management system 102, and/or when such data is transmitted.

In particular embodiments, the control client application 308 and the remote management server 102 may establish encrypted connections. For example, Virtual Private Network (VPN) tunneling and encryption may be used to secure the connection. In a particular implementation, mobile device 104 may include port-based VPN functionality to encrypt the connection between the control client application 308 and the remote management server 102. Still further, since the control client application 308 operates in connection with control points inserted into the protocol stacks of various input/output devices, it can control access to such devices, such as by locking down (preventing data flow to or from) the input/output devices.

In various embodiments, mobile devices 104 may include device management and/or data synchronization functionality. For example, mobile devices 104 may support the Open Mobile Alliance (OMA) Device Management (DM) protocol, and/or the OMA Data Synchronization (DS) protocol. OMA DM is a protocol specified by OMA for DM purposes, by the Device Management Working Group and the Data Synchronization Working Group. One such specification is OMA DM version 1.2, which is incorporated by reference herein. The OMA DM specification is designed for management of small mobile devices such as, by way of example, mobile phones, mobile smart phones, PDAs and palm top computers. The device management may support 1) provisioning (configuration of the device (including first time use), enabling and disabling features); 2) configuration (allowing changes to settings and parameters of the device); 3) software upgrades (providing for new software and/or bug fixes to be loaded on the device, including applications and system software); and 4) fault management (such as reporting errors from the device, querying about status of device). The device management generally takes place by communication between a server (which is managing the device) and the client (the device being managed). OMA DM is designed to support and utilize any number of data transports such as a) physically over both wireline (e.g., USB, RS-232) and wireless media (e.g., GSM, CDMA, Infrared, BlueTooth), and b) transport layers implemented over any of WSP (WAP), HTTP or OBEX or similar transports. The communication protocol is generally a request-response protocol. Authentication and challenge of authentication may be incorporated to ensure the server and client are communicating after proper validation. The communication may be initiated by the OMA DM server, asynchronously, using any of a variety of methods available such as, by way of example, a WAP Push or SMS. Once the communication is established between the server and client, a sequence of messages may be exchanged to complete a given device management task. OMA DM provides for alerts, which are messages that may occur out of sequence, and may be initiated by either server or client. Such alerts may be used to handle errors, abnormal terminations, etc.

Using OMA DM or another suitable protocol, the control client functionality discussed above can be installed on a mobile device. For example, a mobile device without the control client functionality can be provisioned and configured as follows. In a preliminary step, an administrator may create a management instance of the mobile device with a minimal configuration. The mobile device 104, in some implementations, may not be allowed access (or at least full access) to the enterprise's internal network, except for device registration and provisioning with the device management system 102. Suitable identifying information may include a device identifier, a user name, and the like. A user of the mobile device may then be directed to connect to the device management system 102 using, for example, a dial up connection, or a data connection with a WAP browser. The device management system 102, acting as an OMA DM server, may then interrogate the mobile device to learn one or more attributes (such as model number, serial number, operating system type and version, etc.), and provision and configure the mobile device. When the mobile device has been configured, the device management system 102 may further use the configuration and other information related to the mobile device to complete installation of a control agent on the mobile device and remove it from quarantine.

User Portal and Application Store

Users can access a web portal of device management system 102 and access information regarding one or more mobile devices. In one implementation, device management system 102 includes a web or HTML/HTTP-based interface that provides various page views to users associated with mobile devices 104. Each user may be associated with a user profile object, which is a data object maintained in one or more data stores that includes various attributes of a user. In one implementation, the user profile data may be maintained in a Lightweight Directory Access Protocol (LDAP) directory. In one implementation, a user profile object may contain user identifying information such as full legal name, username (for login access to various systems), email address information, domain components (dc), telephone numbers, office locations, organizational information (such as department or group identifiers of an enterprise, reporting structure information, job title, etc.), authentication information, and mobile device profile information (or pointers to device profile data objects). A given user profile data object can include mobile device profile information for more than one mobile device 104. Such mobile device information may include model identifiers, operating system and version, mobile device telephone number, serial numbers, MAC addresses, and specifications (e.g., storage capacity, display size, and the like). In addition, group or department objects can be configured to define one or more attributes that are common to a group or department within an enterprise, such as an engineering or sales department (enterprise-wide or regionally). Furthermore, some groups can be linked as sub-groups to other larger group designations. A user profile data object can be linked to one or more of these groups (either directly or by inheritance). For example, a salesperson may be linked to a "West Coast Sales Team Group," which is a sub-group of a "Sales Division" of a given enterprise.

As discussed above, device management system 102 may maintain or access mobile device profile data objects for corresponding mobile devices 104 that have been registered. Mobile device profile information may include the make and model of the mobile device, an identifier of the operating system and version installed on the mobile device, serial numbers, and Media Access Control (MAC) address (or other unique identifiers associated with one or more communications interfaces of the mobile device). Mobile device profile information may also include pointers to log data received from a control client 308 installed on a mobile device 104. Mobile device profile information may further include an image of the file system maintained on the mobile device 104, such as all applications and application files stored on the mobile device 104. This information may be made available to both users and network administrators for various purposes.

Figure 5:
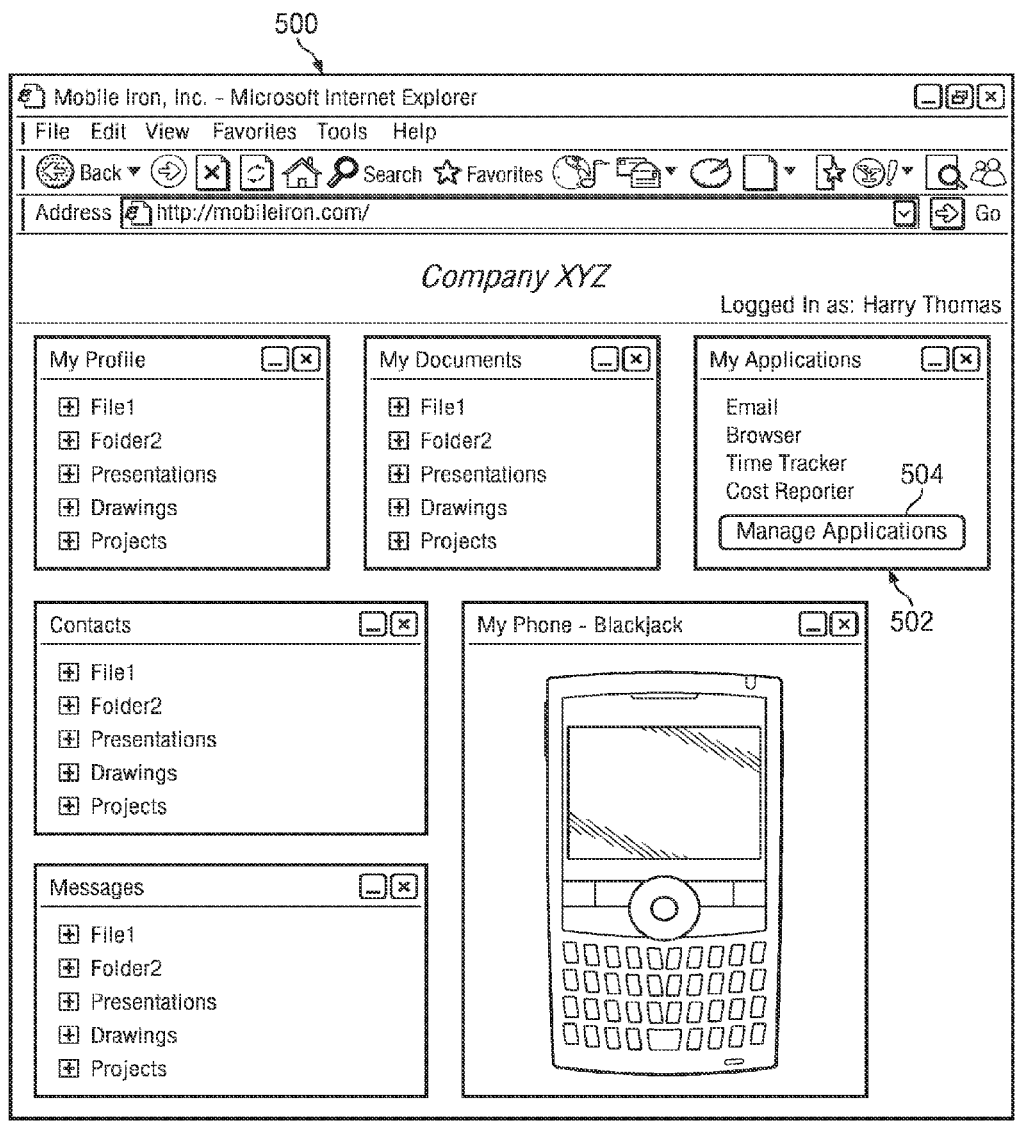
FIG. 5 shows an example user portal interface.

FIG. 5 illustrates an example graphical user interface 500 that mobile device management system 102 may provide to a user after the user logs in. If the user accesses the portal through a mobile device, device management system 102 may provide only one screen component at a time. If a user accesses the portal using a personal computer, device management system may present more categories of relevant information in one screen to the user. Device management system 102 may identify a particular user during a login process, where the user provides a name and password. In other implementations, the user may be identified in connection with a digital certificate, a mobile device identifier, or any other suitable identifying information. In one implementation, device management system 102 may access user profile data to identify one or more mobile device profile data objects associated with the user profile data object to present the user with views of various information on the user's mobile device. If the user is associated with more than one mobile device, the portal interface 500 may include tabs (not shown) to allow the user to view information relevant to each of the user's mobile devices. The user can download or upload or share the data from the web portal. Apart from accessing the data, the user can also perform some functionality like locking the mobile device, locating the device (if GPS enabled) and wiping the data in case of the device being lost.

Figure 6:
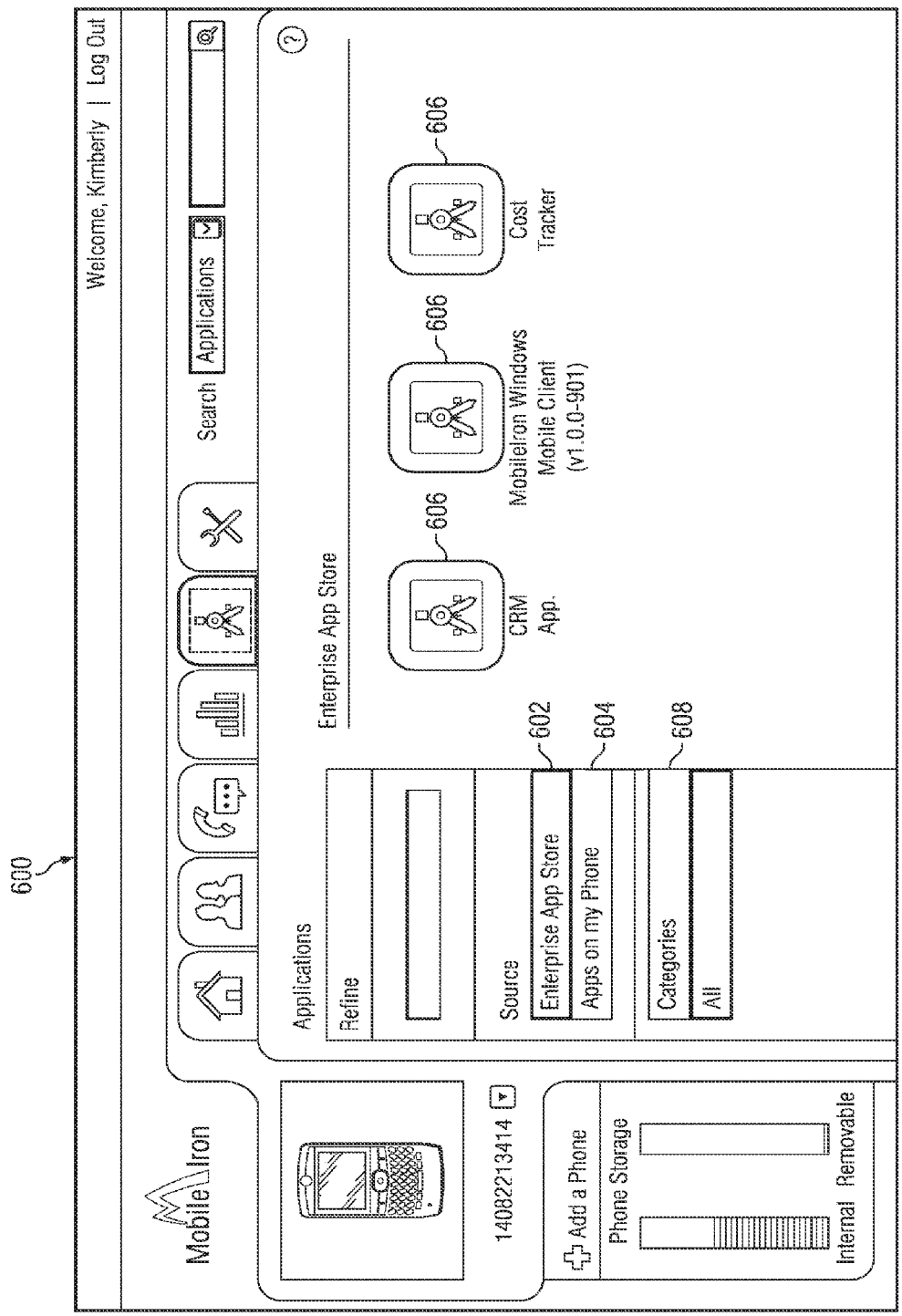
FIG. 6 shows another example user portal interface.

As FIG. 5 illustrates, the portal interface 500 may include an applications section 502 that lists the applications currently installed on the mobile device 104 of the user. In addition, the applications section 502 may include a Manage Applications button that, which activated, provides the user with various interface controls to manage the applications installed on the use's mobile device 104. FIG. 6 illustrates an application management interface 600 that allows a user to manage the applications for a mobile device 104. Application management interface 600 includes an Enterprise App Store tab 602 and an Apps On My Phone tab 604. When a user selects tab 604, the application management interface 600 displays a list of applications currently installed on the user's mobile device 104. Furthermore, an application management application can also be hosted on the mobile device 104 itself.

When the user selects tab 602, a list of available applications from an application catalog are presented to the user. As discussed in more detail below, a network admin may group applications in the application catalog into custom categories (e.g., IT, Sales, Productivity, Utilities, etc.). A user may view the applications grouped into various categories by clicking on Categories tab 608. To install an application on a mobile device, a user may click on an icon for the desired application and confirm the selection. Mobile device management system 102, responsive to the inputs, may schedule the selected application for installation on the corresponding mobile device 104. In one implementation, state information (such as "pending install") may be displayed to the user. Mobile device management system 102 may add the application and installation information (e.g., target mobile device, etc.) to an application install queue. A separate process hosted by mobile device management system 102 may cause control client 308 installed on the mobile device to download and install the selected application. Mobile device management system 102 may use other functionality and protocols, such as OMA, to install the application on mobile device 104.

Figure 7:
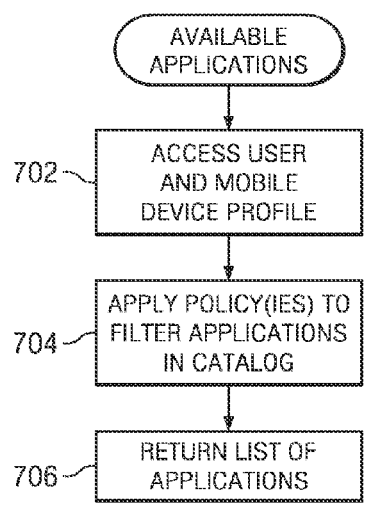
FIG. 7 shows a flowchart illustrating an example process for identifying a list of available applications for a mobile device.

As described herein, the applications displayed to any given user are controlled by application of one or more policies that may consider a variety of factors. These factors may include the identity of the user, the role or job title of the user, the group/department (or sub-group) of the user, the mobile device type and operating system, and the like. FIG. 7 provides a process flow for returning a list of applications from a catalog that are available to a particular user. In the implementation shown, a process or function hosted on device management system 102 accesses user and mobile device profile information as relevant for one or more policies to be applied (702). The process hosted on device management system 102 applies one or more policies to filter the list of available applications from the catalog (704) and returns a list of available applications for display in application management interface 600 (706).

The policies that are applied to filter the applications in the catalog of applications can vary by primary attribute. For example, a first set of policies can filter the application catalog to filter the applications such that only applications that are appropriate for the mobile devices hardware and/or operating system (including version) are provided. For example, if the mobile device of the user includes the Symbian® operating system, only applications in the catalog that run on the Symbian operating system remain after this filter step. Other policies can be based on enterprise organizational information. For example, some applications can be restricted to users based on job title, department, division, or separately configured ad hoc groups. For example, a network administrator may restrict or publish a newly developed, internal application to the West Coast sales team of an enterprise. The policies that a network administrator may configure allow for the appropriate applications to be surfaced to the right users for installation on their respective mobile devices. In addition, as discussed below, device management system 102 also allows network administrators to push application installs to mobile devices 104. In addition, policies can also be configured to identify applications by category and configure policies with respect to a user or group of users. For example, a network administrator can allow access to an entire category of applications relevant to a job function (e.g., sales or engineering) to one user or set of users. Policies can be scripted based on a set of predefined data variables and other parameters maintained by device management system 102. Other policies can be configured to consider attributes of the user (e.g., identity, job function, group/division/organization), and whether the mobile device is a personally-owned or enterprise-owned device. In addition, policies can also be configured to the security level of phone (encrypted vs non-encrypted, personal vs company owned, etc). For example, a policy could be configured to filter out applications requiring a phone with encryption capabilities and/or a company-owned device if the device associated with the user does not meet these criteria. As a configuration example, a network administrator may configure policies based on user identity and device configuration that limit the publication of sensitive applications to only devices and users with the highest levels of trust within a given enterprise.

Network Administrator—Application Management Functions

FIG. 8 illustrates an application management interface 800 that device management system 102 presents to a network administrator. Device management system 102 allows network administrators to perform one or more of the following tasks: Displaying Statistics for an Application; Adding Applications to the Catalog; Editing Application Catalog Entries; Removing Applications from the Catalog; Publishing Applications; Assigning or Unassigning Categories in the Application Catalog; Push-Installing Applications; Distributing Applications; Uninstalling Applications; Revoking Application Permissions, and Blacklisting/Whitelisting Applications.

In particular embodiments, device management system 102 designates one or more group designations for the particular mobile device 104. By way of example, device management system may present a user interface to an IT manager or administrator enabling the manager to enter designation information for each of a plurality of mobile devices. Device management system 102 then designates the one or more group designations with the mobile device by storing or otherwise associating the group designations with the device object within the database. By way of example, an IT manager may designate a particular mobile device 104 as being either personally owned or enterprise (company) owned. As another example, the IT manager may designate the mobile device 104 as being registered with an employee of a particular enterprise department (e.g., sales, marketing, research and development, management, human resources, accounting, etc.). As another example, the IT manager may designate the mobile device 104 as being registered with an employee of a particular class (e.g., management, staff, intern, new hire, etc.). As yet another example, a mobile device 104 may be designated based on the type (e.g., smartphone versus non-smartphone) or manufacturer (e.g., blackberry, apple) of the mobile device 104. In some embodiments, some or all of the group designations may be designated and stored automatically by device management system 102 based on mined information already stored in the database or other location.

Device management system 102 determines one or more data logging policies for each mobile device based on the group designations associated with each particular mobile device. By way of example, an enterprise manager or administrator may dictate particular policies and enter these policies into device management system 102. Afterwards, when group designations are matched to a particular mobile device 104, device management system may then, using the policies entered by the manager, automatically determine data logging policies for the mobile device 104. The data logging policies govern which data is logged (e.g., tracked and/or uploaded) from a particular mobile device to device management system 102. By way of example, a particular device object may be associated with one or more data logging policies stored within the database. Device management system 102 selectively logs (e.g., tracks and/or stores) data from the mobile devices 104 of the enterprise based on the data logging policies associated with each particular mobile device.

In particular embodiments, the database within or connected with device management system 102 stores resources associated with the mobile devices 104. By way of example, each resource may store a particular file, or generally a data structure, as well as corresponding metadata. Each mobile device 104 also stores (e.g., within memory 306) a number of resources each storing a file or data structure and corresponding metadata. In particular embodiments, when control client 308 determines that a particular file or other data structure (hereinafter referred to as "file") has been newly stored, updated, or otherwise modified within mobile device 104, control client 308 creates a hash for the particular file and causes mobile device 104 to transmit the hash to device management system 102. Upon receipt of the hash, device management system 102 determines if the particular file corresponding to the hash (and the file in the mobile device 104) is already stored in one of the resources stored within device management system 102. In particular embodiments, if device management system 102 determines that the resource already exists, the device management system 102 creates a new resource link to the resource and stores or otherwise associates the new resource link with the device object corresponding to the mobile device 104.

Device management system 102 includes application catalog and tracking functionality that manages applications registered with the device management system 102, as well as applications detected on mobile devices 104 that are managed by the device management system 102. Applications managed by device management system 102 have "Catalog" listed in the Source column. Applications detected on managed mobile devices 104 have "External" listed in the Source column. The Application Catalog screen shows the following information for each application: 1) Application Name—An identifier for the application; 2) Category—A manually-assigned category for the application; 3) Platform Name—The platform(s) intended for the application; 4) # Phones—The number of managed mobile devices 104 on which the application is installed; 5) Source—whether the application is managed by device management system 102 or an external application installed after factory defaults were applied; and 6) Watchlist—Displays status if installation or de-installation is pending, but not executed.

FIG. 9 illustrates an application management interface 900 when a network administrator has selected an application— here, Quickpoint, an external application detected by device management system 102 based on log data transmitted by a control client 308 installed on a mobile device. The network administrator may click on the menu items to view additional information under each category. For example, the following summarizes the information that may be provided: 1) Usage—Displays statistics concerning usage of the application (such as a list of all mobile devices 104 that have the application installed); 2) Push-Install—Displays the devices that received this application as the result of an install task issued from the device management system 102; 3) Publish— Displays the labels and devices for which the application has been published, that is, made available for download from the enterprise application store (see above); 4) Watchlist—Displays status if installation or de-installation is pending, but not executed; 5) Details—Displays the application information included in the application catalog entry.

Figure 10:
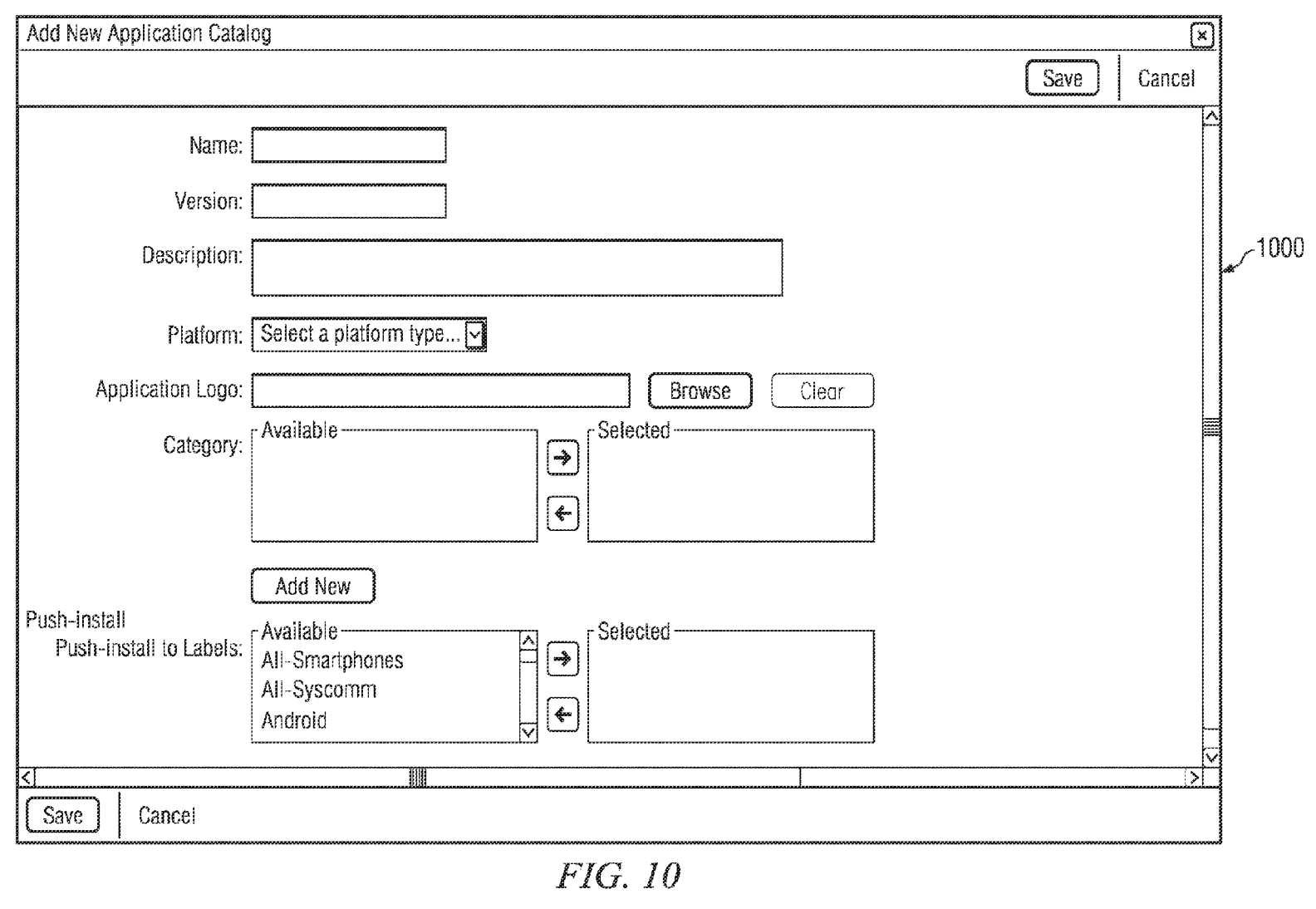

Application management interface 800 also allows network administrators to add applications to be managed by device management system 102. For example, a network administrator may click on the "Add New" button 802, causing device management system 102 to present a new application interface 1000 as illustrated in FIG. 10. Adding an application to the catalog makes it available for installing on managed mobile devices 104 or publishing in the application store. The following summarizes the various input fields of new application interface:

Name—A field for a descriptive name of the application.
Version—A version number for this application.
Description—An explanation of the purpose of this application.
Platform—In this field, a network administrator selects the device platform (e.g., BlackBerry, Symbian, Android, iPhone, Windows Mobile, etc.) for which this application is intended. The platform selected determines which of the following fields appear in the rest of the dialog. In one implementation, the field includes a pull-down menu of platform identifiers.
OS And Version—An entry indicating the names and versions of the operating system this application is compatible with.
Upload Installation File—An entry for the installation file that should be downloaded to selected mobile devices. The selected file will be uploaded and stored on device management system 102.
External application store ID—for external consumer application catalogs, like Apple's App Store, an entry for the application ID associated with the application in that external storefront.
External application link—a link to an installation page for applications that resides outside the enterprise (e.g. salesforce.com).
Application Logo—A field for the location of the logo image that should be downloaded for this application.
Category—In this field, a network administrator may select one or more categories to apply to the application. A network administrator may also create an additional category by clicking a Add New button under the categories list. A category is a classification that may be applied to both managed and external applications. The category that a network administrator assigns an application affects its display in the User Portal. Ad discussed above, users can browse different categories and sources to install managed applications without administrator intervention.
Push-install to Labels—In this field, a network administrator may select labels to specify which groups of managed mobile devices 104 should have the application downloaded and installed automatically. A label refers to a tag or category associated with a managed mobile device or group of managed mobile devices, such as a mobile device platform identifier, an operating system and version, a hardware model, and the like. Label membership can be dictated by enterprise policy as well—for example, a "Trusted" label for highly secure devices and trusted users.
Search Devices—In this field, a network administrator may enter the phone number or user ID to find managed mobile devices 104 on which the network administrator may desire to install this application.
Push-install to Devices—In this field, a network administrator may install this application on the selected managed mobile devices 104.
Publish to Labels—In this field, a network administrator may select labels to specify which groups of managed mobile devices 104 should have the application available in the enterprise application store.
Search Devices—In this field, a network administrator may enter the phone number or user ID to find managed mobile devices 104 to which the admin may want to make this application available via the enterprise application store.
Publish to Devices—In this field, a network administrator may make this application available to the selected managed mobile devices 104 via the enterprise application store. Applications can be published to either labels (i.e. groups) or individual devices, as well.

In addition, the application management interface 800 may also allow a network administrator to designate an application as "required" or "recommended" for a user or set of users. In one implementation, mobile device management system 102 may push required applications to the mobile devices of the users for whom it is a required application. In such implementations, the control client 208 installed on the mobile device 104 may install the required application. In other implementations, the user may be notified that one or more required applications are ready for installation. Notifications may be made via email and/or text message. Mobile device management system 102 may also transmit further reminders to the user if it does not detect the application as being installed during its detection of installed applications on one or more mobile devices 104, as discussed below. Still further, the mobile device 104 may include an enterprise application store application that includes a required applications tab. A user may navigate to this tab to check for new applications or updates to existing applications that should be installed on the mobile device 104.

Network Access Control

As discussed above, device management system 102 may operate in connection with control clients 308 to discover the applications installed on managed mobile devices 104, as well as other state or configuration information related to the mobile devices 104. Users may install applications on their respective managed mobile devices 104 via an enterprise application store 122 or independently by accessing (via a browser or special purpose client) a web site directly on the mobile device for example or accessing a consumer application store external to the enterprise (e.g. Apple's App Store or Google's Android Market). A control client 308 may detect application installs and transmit notifications of such events to device management system 102. In other implementations, control client 308 may transmit log data from which application installs on one or more managed mobile devices 104 may be detected. In other implementations, control client 308 may periodically generate a list of applications installed on a management mobile device 104 and transmit the list to device management system 102. With some mobile platforms, control client 308 may obtain a list of installed applications using published APIs supported by the operating systems of the managed mobile devices 104. Device management system 102 may therefore identify which applications have been installed on the managed mobile devices 104, including whether required applications (and upgrades thereto) have been installed. More generally, a control client 308 may also monitor for events and/or log data that is relevant to a security profile of a managed mobile device 104. For example, control client 308 can be configured to report on Subscriber Identity Module (SIM) card changes on the managed mobile device 104. Control client 308 may also report on large file uploads to a memory card or a remote host, changes to the operating system files or behavior, excessive or uncharacteristic out-of-network roaming, or other activities that may be relevant to a security profile.

The control client 308 and/or the device management system 102 can also be configured to monitor for or detect a variety of other security or device state information (referred to as "posture profiles"). For example, the control client 308 can be configured to transmit state information and event-related data to device management system on a periodic or as-needed basis. Device management system 102 may analyze this data to detect one or more device state changes. For example, as discussed above, control client 308 may transmit notifications of when new applications are installed, or periodically transmit a list of all installed or newly installed applications. Control client 308 may also query the mobile device 104 for various configuration information, such as device identifiers, operating system type and version, SIM card identification information. The mobile device management system 102 can compare this information to a database of device configuration information to determine whether any changes have occurred (e.g., a SIM card change) that, for example, might indicate a security issue. Device management system 102 may also analyze data provided by control client 308 to determine whether a mobile device 104 has been compromised at the operating system level, such as being jailbroken or rooted. In some implementations, control client 308 can be configured to periodically attempt to perform one or more operations or access certain functions that, under an uncompromised operating system, would not be accessible. If one or more of these operations are accessible, the control client 308 can notify mobile device management system 102. Device management system 102 may also determine from the device configuration whether certain functions are enabled or disabled, such as encryption/data protection functions and whether cryptographic keys and digital certificates are installed. Device management system 104 may also determine from the device configuration whether the policy configuration of the mobile device 104 is up-to-date, such as minimum acceptable password attributes and the like. Device management system 102 may also examine log or event related data to determine whether the mobile device 104 was recently in contact or whether there has been no connection within a period of time. Device management system 102 may also examine log or event related data to identify unusual activity, such as travel, volume of data transfer or calls, web sites visited or other indications of a potential security issue or heightened security risk.

Managed mobile devices 104 can be configured to access various enterprise network services that are hosted by or on behalf of an enterprise. For example, with reference to FIG. 1, a given enterprise may include a Microsoft Exchange Server 112 with Exchange ActiveSync functionality. Microsoft Exchange, however, is identified merely for purposes of illustration. Any enterprise e-mail, communication and/or collaboration services can be used in the enterprise networks. Other enterprise network services may include connectivity services, such as Virtual Private Networking (VPN) and WiFi access. Managed mobile devices 104 may also access application server 114 directly or through SSL/VPN/Firewall gateway 120. Managed mobile devices 104 may also host applications that are configured to access systems external to the enterprise network 110. Various differences between mobile devices and other computing systems (such as personal computers and laptops) present challenges to network administrators relative to network security. Users of managed mobile devices 104, for example, typically have much more control over the ability to install applications—even unauthorized applications—either by access sites directly or through remote application stores. In addition, mobile devices 104 communicate over network paths and channels, such as carrier networks, that an enterprise has little to no control of. Accordingly, a network administrator may not simply block a switch port to which a host raising security concerns is connected or to deny access to certain remote hosts. Still further, mobile devices have a variety of sensor devices, such as Bluetooth interfaces, GPS modules, cameras, and microphones, that malicious applications may exploit in order to gather data about users.

As discussed herein, mobile device management system 102 may analyze the security-related information described above and set one or more security state indications in a posture-based profile of respective mobile devices that are operative to control access to an enterprise network entirely or specific enterprise applications. The posture-based profile is accessible to one or more network applications via a set of application programming interfaces, that allow for configuration of flexible, posture-based decisions. For example, the mobile device management system 102 may determine and set one or more bits or other parameter values in a security table that indicates whether a mobile device 104 has a blacklisted application, whether a SIM card has been changed, whether a device has been jailbroken or rooted, whether excessive roaming has been detected, whether a mobile device lacks a required application or fails to have updated policies installed, as well as other factors discussed above. One or more network application services can query this security state table when making admission control decisions when a mobile device 104 attempts to access a given service. Blocking access represents one of the possible actions that could be triggered in connection with analyzing the posture-based profile. Other examples include locking the mobile device, wiping the mobile device, and transmitting user notifications. The posture-based profile may include for example indications of whether unauthorized applications are installed, or whether the security policies configured on a given mobile phone are up-to-date. A network administrator may then create a number of policies that flexibly adapt to such situations, as described herein. For example, if the operating system integrity of a mobile phone is compromised, a network admin may desire to initiate a wipe action. If the security configurations of the mobile phone are out of date, a network admin may not fell that this condition is critical enough to initiate a wipe action. Accordingly, a policy can be configured to trigger an access control block action. As an additional example, a policy can be configured to transmit warning notifications to the user and the network administrator, if an unauthorized application is detected on a mobile phone.

Figure 11:
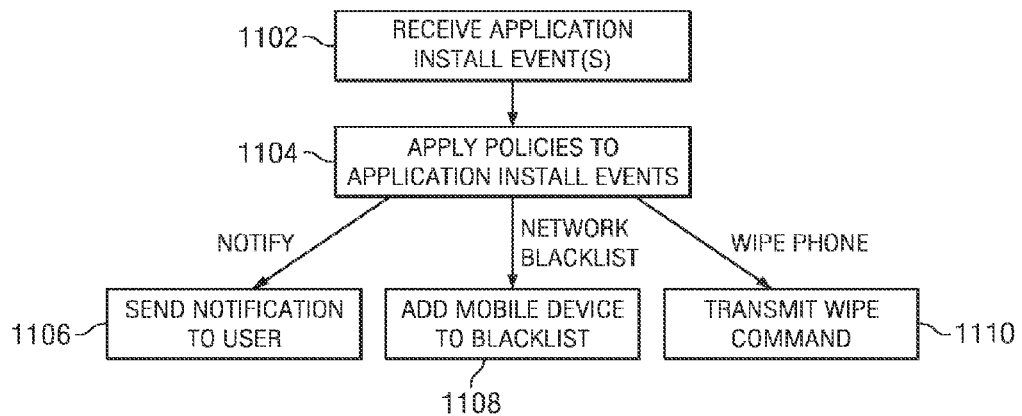
FIG. 11 shows a flowchart illustrating an example process for applying policies that respond to installation of an application on a mobile device.

In a particular implementation, for example, mobile device management system 102 may include functionality that allows network administrators to blacklist or otherwise identify select applications and configure policies that are triggered in response to detection of their installation on one or more managed mobile devices 104. FIG. 11 illustrates an example process that may be implemented by device management system 102. The process illustrated in FIG. 11 may be initiated in response to individual events or may be iteratively applied on a periodic basis to a set of events stored in a queue. As FIG. 11 illustrates, device management system 102 may receive an indication of an event that a new application has been installed on a managed mobile device 104 (1102). The event may be generated by a control client 308 that transmits an event notification to mobile device management system 102. The event may be generated by mobile device management system 102 when it detects a new application in a list of applications provided by the control client 308. Device management system 102 then applies one or more policies to the application install event (1104). Device management system 102 can be configured to apply a wide variety of policies. In one implementation, at least one policy may determine whether the newly installed application has been placed on a blacklist. In other implementations, another policy may be configured to determine whether the newly installed application is a recognized or generally known application, or an unknown application or potential virus. A network administrator can configure policies to respond to application install events in a variety of manners. For example, for a first set of applications that are unauthorized, but do not present security issues, mobile device management system 102 may be configured to transmit a notification or warning to the user of the managed mobile device 104 that the application is unauthorized (1106) and, therefore, will not be supported by the enterprise's information technology (IT) department. Another policy can be configured to cause the mobile device management system 102 to transmit a wipe command to the control client 308 hosted on the managed mobile device 104 (1110), which causes the entire storage device to be erased. In other implementations, a partial wipe may be implemented to delete a selected subset of the files stored in the mobile device 104. This policy can be configured if a known virus or other malicious application is detected. Another policy type can be cause the control client 308 resident on the mobile device 104 to lock down one or more of the input/output devices of the mobile device 104. Other policies can be configured to push new policy configurations to the mobile device, such as an updated password policy.

Some policies can also be configured to block access to the services provided by enterprise network 110. For example, as discussed above, a managed mobile device 104 accesses enterprise network systems (e.g., email servers, SSL/VPN Servers, and other applications) for a wide variety of functions. Mobile device management system 102 can be configured to signal the security state of a managed mobile device 104 to these enterprise services, which may then admit or deny access to the managed mobile device 104. In one implementation, mobile device management system 102 may be configured to set one or more security profile values in a data object, such as a security state table, associated with the mobile device 104. These values can be distilled down to one Boolean value, such as an accept or admit (True/False) value. An enterprise application may be configured to access this parameter value when deciding whether to accept or reject the requests or other messages of the mobile device 104. For example, an enterprise application service may be configured to inspect one or more profile values, such as unauthorized applications, disabled encryption mechanisms, SIM card changes, jailbroken indicators and the like, in order to decide whether to admit or reject the mobile device 104. In other implementations, the mobile device management system 102 may transmit blacklists or white lists to various enterprise applications. These lists can be consulted by an exchange server 112, an SSL/VPN gateway 120, an internal web site, a document or file system, and/or an application server 114, for example, when deciding whether to accept or reject the requests or other messages of the mobile device 104. As a further example, a web sockets proxy or firewall can be configured to consult a security state table to determine the current security state of a mobile device and filter traffic associated with mobile devices 104 that do not meet a required security profile. In other implementations, the web sockets proxy/firewall can be configured to permit traffic that identifies ports corresponding to certain, authorized applications, while blocking all other traffic. In this manner, a network administrator may control access to enterprise network services and maintain security, while allowing the mobile device 104 to operate with applications that access systems or hosts external to the enterprise network 110, such as calling functions, and third party applications. Other implementations are possible. For example, mobile device management system 102 may maintain a variety of attribute values for a managed mobile device 104. A given application can be configured via a set of APIs to access one to a combination of these attributes when deciding to accept/reject access to a mobile device 104, as discussed above.

In some implementations, mobile device management system 102 may include a component that that interacts with an ActiveSync/Exchange server 112 to provide the following functionality: 1) gives enterprise admins visibility into all devices attempting to connect to corporate email; 2) allows automatic permit/deny functions; and 3) provides remote wipe capabilities for mobile devices 104. This functionality can be provided by directly integrating one or more code modules with an ActiveSync/Exchange server 112. For example, a plug-in or other code module can be hosted on ActiveSync/Exchange server 112. The module may be configured to transmit information on mobile devices 104 accessing the server. In other implementations, mobile device management system 102 may be configured in a stand alone mode as an intermediate system (e.g., such as a proxy) in the communications path between ActiveSync/Exchange server 112 and mobile devices 104. The component can be configured to query the ActiveSync/Exchange server 112 for information identifying the mobile devices that are accessing it. In other implementations, the proxy component may be configured to provide mobile device information to the mobile device management system 102. FIG. 12 illustrates a user interface that lists the detected mobile devices that access ActiveSync/Exchange server 112. A network administrator may also configure one or more ActiveSync policies to specify the Exchange ActiveSync (EAS) policies to apply to selected mobile devices that use ActiveSync to connect to the ActiveSync/Exchange server 112.

In addition, using the mobile device management system 102, a network administrator may specify whether to enable various functions available via ActiveSync or generally, such as text messaging, email access, and browser access. The component may also determine whether the mobile devices 104 that access the ActiveSync/Exchange server 112 are registered with the mobile device management server 102. Various policies can be configured to accept/reject access based on this determination. For example, one policy can block ActiveSync connections to unregistered mobile devices 104. Another policy can be executed to start a registration workflow for an unregistered mobile device.

Local Control of Applications

Figure 13:
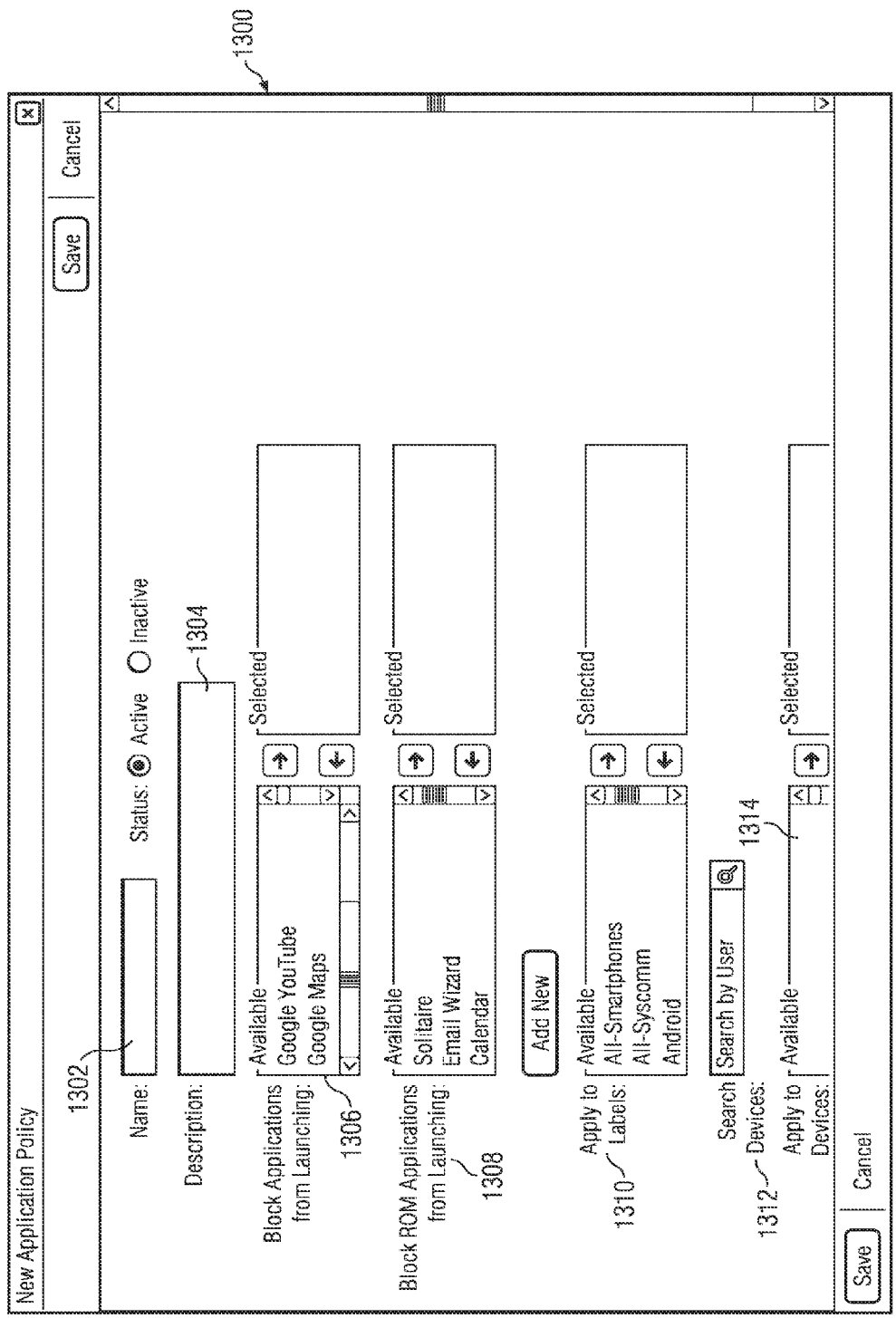
FIG. 13 is an example management interface for blocking applications from launching on managed mobile devices.

In some implementations, in addition to access control mechanisms discussed above, mobile device management system 102 can operate in connection with control clients 308 installed on managed mobile devices 104 to block an application from launching. FIG. 13 illustrates an example application management interface 1300 that allows a network administrator to configure one or more policies that block selected applications from launching one select managed mobile devices 104. The following summarizes the fields provided by application management interface 1300:

Name (1302)—A field to enter a descriptive name for the policy. This is the text that will be displayed to identify this policy.

Description (1304)—A field to enter an explanation of the purpose of this policy.

Block Applications from Launching (1306)—Using this control, a network administrator may select which applications should be blacklisted—that is, prevented from being started. The applications appearing in the Available list, in one embodiment, are those that were installed after factory defaults were loaded.

Block ROM Applications from Launching (1308)—For certain Windows Mobile platforms (such as WM 6.1), a network administrator may select one or more ROM applications as being blacklisted. Solitaire.exe is an example of a ROM application that an admin may want to block. A network admin can also click the Add New button to specify other ROM applications to add to the list.

Apply to Labels (1310)—Using this control, a network admin may associate this policy with the selected labels that are used to define ad hoc groups of mobile devices, such as "All iPhones," and the like.

Search Devices (1312)—In this field, a network admin may enter the phone number or user ID to find selected mobile devices to which the admin may want to apply the policy. Search results appear in results field 1314, the entries to which a network admin may select for application of the policy.

After a network administrator has configured a blacklist policy for an application and activated it, the mobile device management system 102 may deploy the policy. In one implementation, depending on what methods the admin has used to identify the mobile devices (e.g., labels, specific phones, etc.), the mobile device management system 102 identifies the managed mobile devices 104 to which the policy applies. Mobile device management system 102 then transmits a new policy configuration to the respective control clients 308 installed on the mobile devices. In one implementation, the new policy configuration can be an updated blacklist of applications that are to be prevented from launching. Since the control client 308 includes control points at the MMI and file system layers, it can monitor for commands to launch executables and prevent commands identifying blacklisted applications from being launched. The foregoing blacklisting policy enforcement mechanism can be used in lieu of or in addition to the network blacklisting functionality described above.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving from a mobile device a request for a set of applications available for installation on the mobile device;
accessing a user profile associated with the request;
filtering a catalog of applications based on an application availability policy applied to a user attribute in the user profile to select a set of applications, wherein said user attribute includes enterprise organizational information of the user, the application availability policy identifying one or more applications in the catalog to be included in a set of applications to be made available to users having the user attribute; and
returning the set of applications in response to the request, wherein the mobile device is configured to display the set of applications to the user via an application management interface and to provide the ability for the user to select, via the application management interface, one or more of the displayed applications for installation on the mobile device.

2. The method of claim 1, further comprising accessing a user directory store to retrieve the user profile.

3. The method of claim 1, wherein the user profile comprises a role associated with the user, and wherein the application availability policy associates with the role one or more applications in the catalog of applications.

4. The method of claim 3, wherein filtering the catalog of applications comprises including in the set of applications the one or more applications that the application availability policy associates with the role.

5. The method of claim 1, wherein the user attribute comprises a group identifier associated with the user, and wherein the application availability associates with the group identifier one or more applications in the catalog of applications.

6. The method of claim 1, further comprising:
identifying based at least in part on the user attribute at least a subset of applications in the set of applications as being required to be installed on the mobile device; and
providing to the user an indication of which applications in the set of applications are required to be installed.

7. The method of claim 1, wherein the application management interface comprises an app store interface.

8. A mobile device management system, comprising:
a storage device configured to store an application availability policy; and
a processor coupled to the storage device and configured to:
receive from a mobile device a request for a set of applications available for installation on the mobile device;
access a user profile associated with the request;
filter a catalog of applications based on the application availability policy applied to a user attribute in the user profile to select a set of applications, wherein said user attribute includes enterprise organizational information of the user, the application availability policy identifying one or more applications in the catalog to be included in a set of applications to be made available to users having the user attribute; and
return the set of applications in response to the request,
wherein the mobile device is configured to display the set of applications to the user via an application management interface and to provide the ability for the user to select, via the application management interface, one or more of the displayed applications for installation on the mobile device.

9. The system of claim 8, wherein the processor is further configured to access a user directory store to retrieve the user profile.

10. The system of claim 8, wherein the user profile comprises a role associated with the user, and wherein the application availability policy associates with the role one or more applications in the catalog of applications.

11. The system of claim 10, wherein filtering the catalog of applications comprises including in the set of applications the one or more applications that the application availability policy associates with the role.

12. The system of claim 8, wherein the user attribute comprises a group identifier associated with the user, and wherein the application availability associates with the group identifier one or more applications in the catalog of applications.

13. The system of claim 8, wherein the processor is further configured to:
identify based at least in part on the user attribute at least a subset of applications in the set of applications as being required to be installed on the mobile device; and
provide to the user an indication of which applications in the set of applications are required to be installed.

14. The system of claim 8, wherein the application management interface comprises an app store interface.

15. A computer program product to manage mobile devices, the computer program product being embodied in a tangible, non-transitory computer readable storage medium, and comprising computer instructions for:
receiving from a mobile device a request for a set of applications available for installation on the mobile device;
accessing a user profile associated with the request;
filtering a catalog of applications based on an application availability policy applied to a user attribute in the user profile to select a set of applications, wherein said user attribute includes enterprise organizational information of the user, the application availability policy identifying one or more applications in the catalog to be included in a set of applications to be made available to users having the user attribute; and
returning the set of applications in response to the request,
wherein the mobile device is configured to display the set of applications to the user via an application management interface and to provide the ability for the user to select, via the application management interface, one or more of the displayed applications for installation on the mobile device.

16. The computer program product of claim 15, further comprising computer instructions for accessing a user directory store to retrieve the user profile.

17. The computer program product of claim 15, wherein the user profile comprises a role associated with the user, and wherein the application availability policy associates with the role one or more applications in the catalog of applications.

18. The computer program product of claim 17, wherein filtering the catalog of applications comprises including in the set of applications the one or more applications that the application availability policy associates with the role.

19. The computer program product of claim 15, wherein the user attribute comprises a group identifier associated with the user, and wherein the application availability associates with the group identifier one or more applications in the catalog of applications.

20. The computer program product of claim 15, further comprising computer instructions for:
identifying based at least in part on the user attribute at least a subset of applications in the set of applications as being required to be installed on the mobile device; and
providing to the user an indication of which applications in the set of applications are required to be installed.

* * * * *